United States Patent
Wada

(10) Patent No.: US 6,847,375 B2
(45) Date of Patent: Jan. 25, 2005

(54) RENDERING PROCESS

(75) Inventor: Shinya Wada, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 104 days.

(21) Appl. No.: 10/193,880

(22) Filed: Jul. 12, 2002

(65) Prior Publication Data

US 2003/0020712 A1 Jan. 30, 2003

(30) Foreign Application Priority Data

Jul. 13, 2001 (JP) ........................................ 2001-213767
Feb. 5, 2002 (JP) ........................................ 2002-028026

(51) Int. Cl.$^7$ ................................................. G09G 5/00
(52) U.S. Cl. ........................ 345/589; 345/592; 345/613
(58) Field of Search ................................ 345/589, 592, 345/612–614, 629, 694–696, FOR 168, 171

(56) References Cited

U.S. PATENT DOCUMENTS 6,271,850 B1 * 8/2001 Kida et al. .................. 345/422

6,429,877 B1 * 8/2002 Stroyan ...................... 345/611

FOREIGN PATENT DOCUMENTS

| JP | 8235380 A | 9/1996 |
| JP | 08-235380 A1 | 9/1996 |
| JP | 09-282473 A1 | 10/1997 |
| JP | 9282473 A | 10/1997 |
| JP | 2000-285256 A1 | 10/2000 |

* cited by examiner

Primary Examiner—Matthew C. Bella
Assistant Examiner—Greg Cunningham
(74) Attorney, Agent, or Firm—Lerner, David, Littenberg, Krumholz & Mentlik, LLP

(57) ABSTRACT

A value for expressing the fraction of the area occupied by a polygon within a pixel and a value for expressing the degree of transparency of the pixel are multiplied together for each pixel. The multiplied product is reset as the degree of transparency for each pixel, according to which a color preset for each pixel composing the polygon is mixed with the colors of other pixels rendered on a two-dimensional coordinate which is substantially the same as that for the pixels composing the polygon. This allows semi-transparent polygons to be processed by anti-aliasing without being changed into opaque polygons.

7 Claims, 5 Drawing Sheets

RENDERING PROCESS

CROSS-REFERENCE TO RELATED APPLICATIONS

This application claims priority from Japanese Patent Application No. 2001-213767 filed on Jul. 13, 2001, and No. 2002-28026 filed on Feb. 5, 2002, the disclosures of which are incorporated by reference herein.

BACKGROUND OF THE INVENTION

The present invention relates to a rendering process for displaying three-dimensional images on a two-dimensional screen, such as on a television monitor, a device used therefor, a recording medium having recorded thereon a rendering process program and such rendering process program.

There are accelerating trends in higher integration and faster processing speed of processors and memories in recent television game console machines and personal computers, so that a rendering processing device composed of such game console machine or personal computer can generate fine, high-definition, diversified two-dimensional images with real presence in a real-time manner, and can display them on two-dimensional monitor screens.

When a three-dimensional image is rendered on a two-dimensional monitor screen, the three-dimensional polygon data are subjected to various geometric processes such as coordinate conversion, clipping and lighting, and the resultant data are further subjected to transparent projection conversion. The rendering processing device pastes textures having various colors and patterns onto polygons to thereby give desired colors and patterns to the objects.

The three-dimensional polygons herein are to be expressed with a limited number of pixels on the two-dimensional screen, so that an image rendered on the two-dimensional screen will clearly have various disorders generally referred to as aliasing. In particular, the edge portion of an image traversing obliquely on the two-dimensional screen will have a step-like unsmoothness (so-called jaggedness) representing pixel profiles on the edge of the image.

Thus, a conventional rendering processing device employs so-called anti-aliasing, which is a process for removing or preventing aliasing such as jaggedness. A typical anti-aliasing process employed by the conventional rendering processing device for removing jaggedness is as follows.

The rendering processing device first determines pixel coverage, and then sets an $\alpha$ value corresponding to such pixel coverage. The device then mixes a pixel color to be used as a background and a pixel color to be used as a foreground according to such $\alpha$ value, which successfully makes the jaggedness unrecognizable. This technique is adopted by an extremely large number of rendering processing devices since only a single time of processing will successfully yield effective anti-aliasing. The pixel coverage herein refers to a value for expressing a fraction of the area occupied by a polygon within one pixel, and is given by a real number ranging from 0 to 1. For example, any pixel not containing an edge portion will have a value of "1" for the pixel coverage. The $\alpha$ value refers to a degree of transparency (semi-transparency) used in the rendering process of the individual pixels, and is given by a real number ranging from 0 to 1. For example, a pixel having a value of "1" for the $\alpha$ value is an opaque pixel. For the case that the foreground pixels are opaque, the color of such foreground pixels will never be mixed with the color of background pixels.

The foregoing anti-aliasing technique is, however, not applicable to polygons which are semi-transparent from the beginning. That is, the foregoing anti-aliasing technique gives a pixel coverage value of "1" for all pixels other than those located in the edge portion, so that the $\alpha$ values for such pixels are inevitably set to "1". This means that the foregoing anti-aliasing technique undesirably changes polygons which should intrinsically be semi-transparent into opaque ones. This is why the foregoing anti-aliasing technique is not applicable to polygons which are semi-transparent from the beginning.

SUMMARY OF THE INVENTION

The present invention was proposed to address the foregoing problems, and an object thereof resides in providing a rendering process capable of subjecting semi-transparent polygons to anti-aliasing, a device used therefor, a recording medium having recorded thereon a rendering process program and such rendering process program.

According to the present invention, in a polygon composed of a plurality of pixels, a value for expressing a fraction of the area of a specified pixel occupied by the polygon and a value for expressing a degree of transparency corresponding to the specified pixel are multiplied with each other to obtain a multiplied product. The multiplied product is reset as a new degree of transparency for the specified pixel. A preset color for the specified pixel is mixed with a color of another pixel adjacent the specified pixel and not in the polygon based on the multiplied product.

That is, according to the present invention, a value obtained by multiplying a source $\alpha$ by the pixel coverage is reset as a new $\alpha$ value, based on which $\alpha$-blending is carried out. This allows semi-transparent polygons to be processed by anti-aliasing without being changed into opaque polygons.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing the invention in practice.

DETAILED DESCRIPTION

Figure 1:
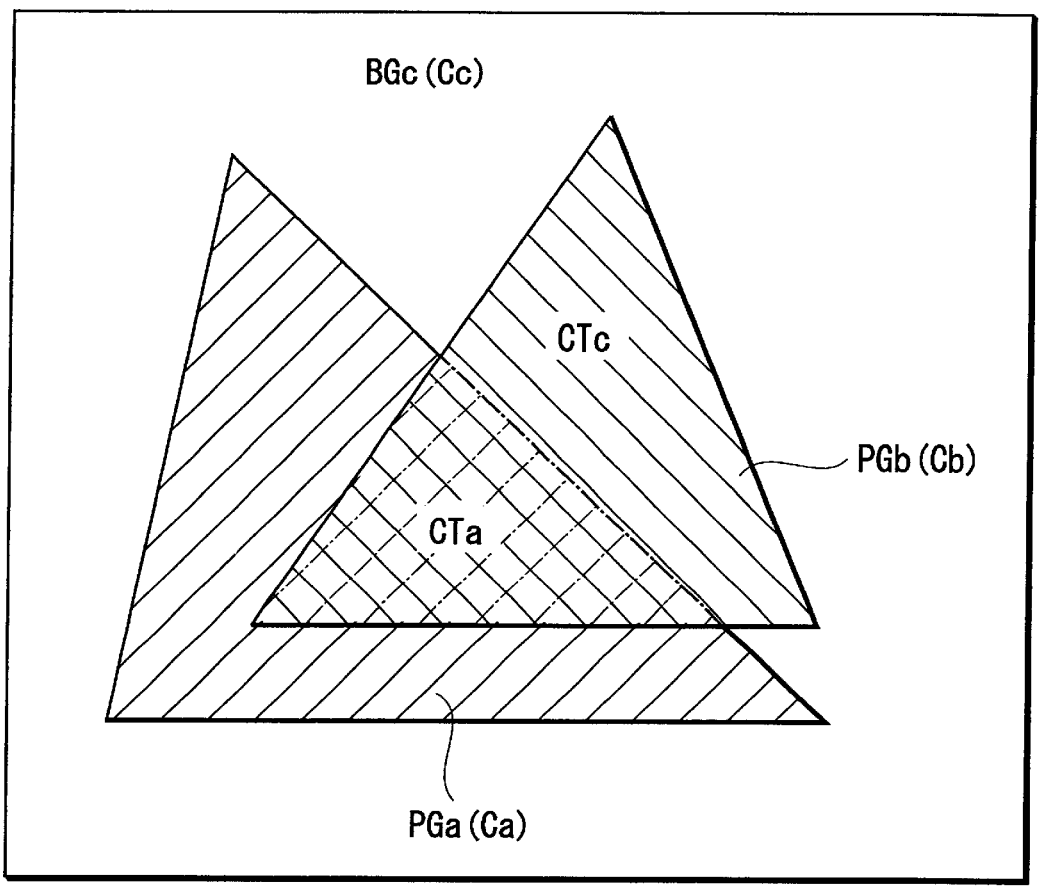
FIG. 1 is a drawing of a semi-transparent polygon rendered as being laid across an opaque polygon and a background.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

An outline of anti-aliasing executed by the rendering processing device of the present invention will be explained with reference to FIGS. 1 and 2.

The following description deals with a case in which an opaque polygon PGa is placed on a background BGc, and a semi-transparent polygon PGb is further placed thereon so as to be laid across such opaque polygon PGa and background BGc as shown in FIG. 1.

It is to be noted in the following description, the source α values of the individual pixels composing the semi-transparent polygon PGb are denoted as αb, the color of the individual pixels composing the opaque polygon PGa is denoted as Ca, the color of the individual pixels composing the semi-transparent polygon PGb is denoted as Cb, and the color of the individual pixels composing the background BGc is denoted as Cc.

When the semi-transparent polygon PGb is rendered by α-blending, the pixel color Ca of the opaque polygon PGa and the pixel color Cc of the background BGc are used as destination colors, and such destination colors (Ca, Cc) are α-blended with the pixel color Cb of the semi-transparent polygon PGb. Note that α-blending refers to a rendering technique by which pixels composing different polygons are rendered on the same two-dimensional coordinates by mixing the individual colors thereof according to the α values.

Assuming that, as shown in FIG. 1, the pixel color in the overlapped area of the semi-transparent polygon PGb and the opaque polygon PGa obtained after α-blending is denoted as CTa, and the pixel color in the overlapped area of the semi-transparent polygon PGb and the background BGc obtained after α-blending is denoted as CTc, such pixel colors CTa and CTc in the overlapped areas can be expressed by the following formulae (1) and (2):

$$CTa = \alpha b * Cb + (1 - \alpha b) * Ca \quad (1)$$

$$CTc = \alpha b * Cb + (1 - \alpha b) * Cc \quad (2)$$

Next, the rendering processing device generates information on the pixel coverage taking the source α value αb of the semi-transparent polygon PGb into consideration, and uses such pixel coverage as an α value in the α-blending, to thereby complete anti-aliasing for the semi-transparent polygon PGb. A procedure by which the rendering processing device of the present invention generates such information on the pixel coverage taking the source α value αb of the semi-transparent polygon PGb into consideration is as follows.

Assuming now that the pixel coverage of the individual pixels composing the semi-transparent polygon PGb is Cov, the pixel color in the overlapped area of the semi-transparent polygon PGb and the opaque polygon PGa after anti-aliasing is CTAa, and the pixel color in the overlapped area of the semi-transparent polygon PGb and background BGc is CTAc, such pixel colors CTAa and CTAc can be expressed by the following formulae (3) and (4):

$$CTAa = Cov * CTa + (1 - Cov) * Ca \quad (3)$$

$$CTAc = Cov * CTc + (1 - Cov) * Cc \quad (4)$$

where pixel coverage value Cov equals "1" when the pixel is completely (by 100%) covered with the semi-transparent polygon PGb, and equals "0" when the pixel is not covered at all.

Substitution of formula (1) in formula (3) yields formula (5), and substitution of formula (2) in formula (4) yields formula (6) below:

$$CTAa = (Cov * \alpha b) * Cb + (1 - (Cov * \alpha b)) * Ca \quad (5)$$

$$CTAc = (Cov * \alpha b) * Cb + (1 - (Cov * \alpha b)) * Cc \quad (6)$$

where the term $(Cov * \alpha b) * Cb$ in formula (5) corresponds with the term $\alpha b * Cb$ in formula (1), and the term $(Cov * \alpha b) * Cb$ in formula (6) corresponds with the term $\alpha b * Cb$ in formula (2). Similarly, the term $(1 - (Cov * \alpha b)) * Ca$ in formula (5) corresponds with the term $(1 - \alpha b) * Ca$ in formula (1), and the term $(1 - (Cov * \alpha b)) * Cc$ in formula (6) corresponds with the term $(1 - \alpha b) * Cc$ in formula (2). That is, these formulae (5) and (6) express processing equivalent to the general α-blending except that they use, as a new α value, a source α value of the semi-transparent polygon PGb multiplied by the pixel coverage Cov.

Calculation results of the formulae (5) and (6) will specifically be explained with reference to FIG. 2. FIG. 2 is an enlarged view of the boundary portion of the semi-transparent polygon PGb and opaque polygon PGa shown in FIG. 1 so that formula (5) is adapted for α-blending. The reference symbol Eb in FIG. 2 denotes an edge boundary of the semi-transparent polygon PGb. Reference symbols p1 to p6, p11 to p16 and p21 to p25 respectively represent the pixels. Pixel coverage value Cov is now defined as 0.2 for the pixels p1 to p6, 0.8 for the pixels p11 to p16, and 1 for the pixels p21 to p25. The source α value αb (preset a value) of the semi-transparent polygon PGb is defined now as 0.5. Note that in FIG. 2 the pixel color of the semi-transparent polygon PGb is expressed as Cb and the pixel color of the opaque polygon PGa is expressed as Ca.

In the exemplary case shown in FIG. 2, the pixel color CTAa of the pixels p1 to p6 after anti-aliasing based on formula (5) is expressed by formula (7) below:

$$CTAa = (0.2 * 0.5)Cb + (1 - (0.2 * 0.5)) * Ca = 0.1 * Cb + 0.9 * Ca \quad (7)$$

Formula (7) indicates that the pixel colors Cb and Ca are mixed at a ratio of (0.1*Cb+0.9*Ca).

The pixel color CTAa after anti-aliasing of the pixels p11 to p16 is expressed by formula (8) below:

$$CTAa = (0.8 * 0.5)Cb + (1 - (0.8 * 0.5)) * Ca = 0.4 * Cb + 0.6 * Ca \quad (8)$$

Formula (8) indicates that the pixel colors Cb and Ca are mixed at a ratio of (0.4*Cb+0.6*Ca).

The pixel color CTAa after anti-aliasing of the pixels p21 to p26 is expressed by formula (9) below:

$$CTAa = (1 * 0.5)Cb + (1 - (1 * 0.5)) * Ca = 0.5 * Cb + 0.5 * Ca \quad (9)$$

Formula (9) indicates that the pixel colors Cb and Ca are mixed at a ratio of (0.5*Cb+0.5*Ca).

Figure 2:
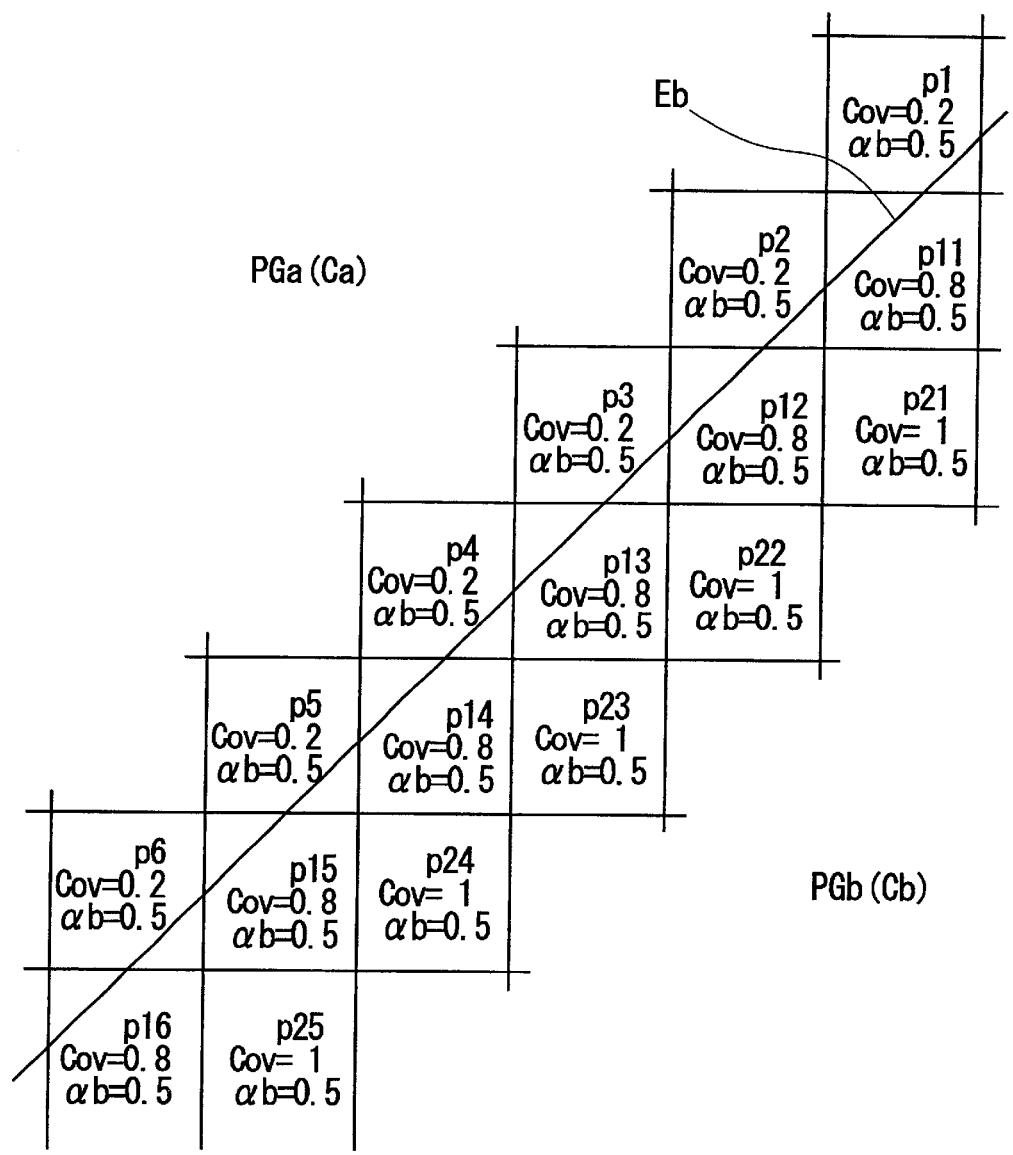
FIG. 2 is an enlarged view of an edge portion of the semi-transparent polygon rendered on the opaque polygon.

It is known from the above that the pixels p1 to p6 and p11 to p16 including the edge boundary Eb shown in FIG. 2 will have anti-aliasing depending on the pixel coverage. On the other hand, the pixels p21 to p25 not including the edge boundary Eb will never be turned into opaque even after anti-aliasing so that the opaque polygon PGa can be seen through the semi-transparent polygon PGb.

As has been described above, the rendering processing device according to the present embodiment multiplies a source α value of the semi-transparent polygon by the pixel coverage, and uses the thus obtained multiplied product as a new α value for α-blending to thereby enable anti-aliasing of such semi-transparent polygon in only a single time of processing.

Figure 3:
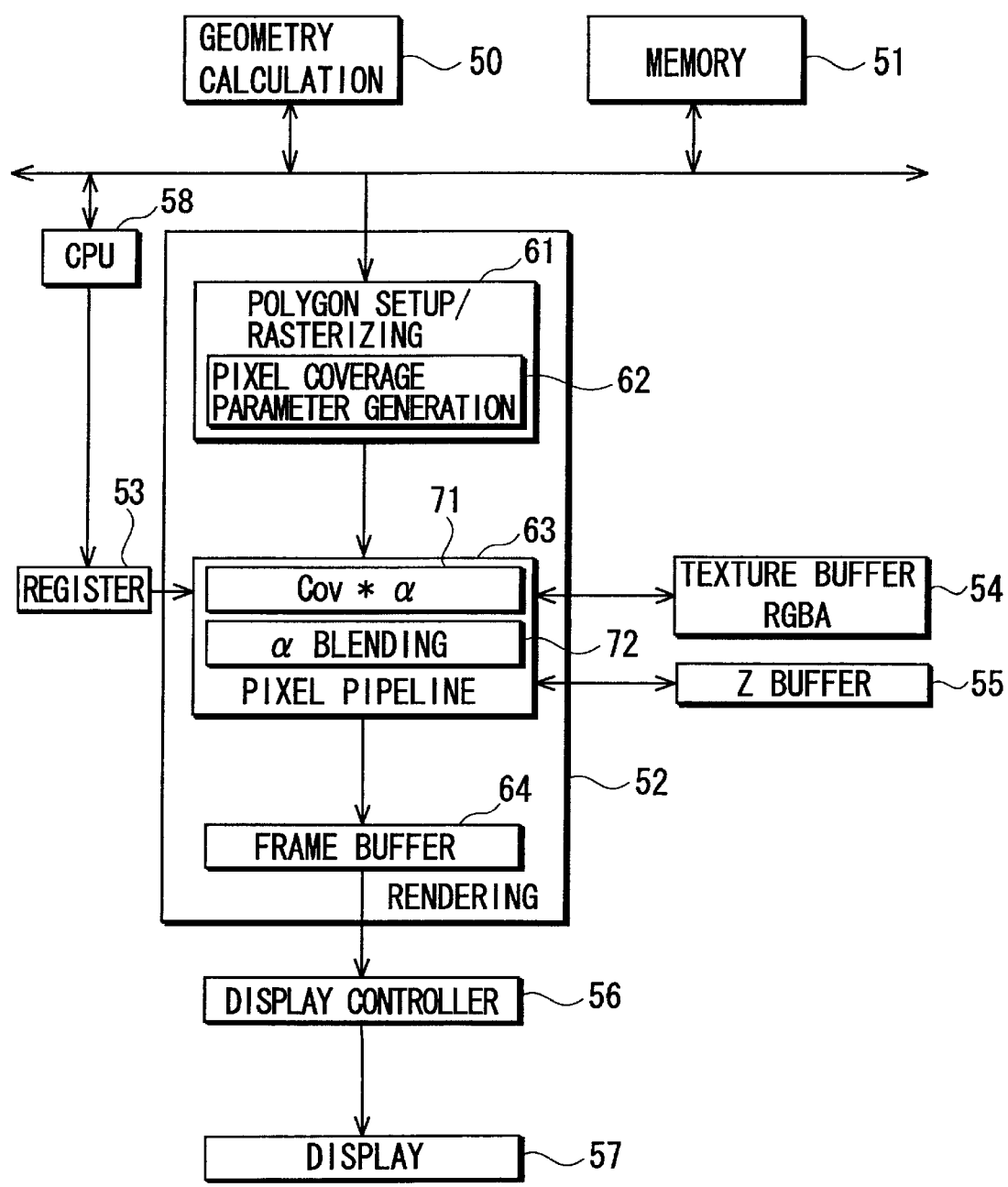
FIG. 3 is a block diagram showing an exemplary specific constitution of a device for implementing a rendering process including anti-aliasing.

FIG. 3 shows an exemplary specific constitution of the rendering processing device responsible for the foregoing anti-aliasing. The constitution shown in FIG. 3 is one example by which the rendering process of the present embodiment is carried out by hardware such as a digital signal processor (DSP) or a graphic processor (GP). The individual components shown in FIG. 3 correspond to the individual internal processing units of such DSP or GP.

As shown in FIG. 3, a memory 51 stores graphic information such as polygons (apex information or apex-linked information such as coordinate values for apexes, RGB apex color values, map coordinate values and vector values). The graphic information herein is previously captured by being read out from various recording media such as a CD-ROM, DVD-ROM or semiconductor memory, or by being downloaded through communication or transmission media based on line or radio communication.

A CPU 58 controls operations of the individual units based on a control program.

A geometry calculation unit 50 retrieves stored graphic information from the memory 51, and then subjects the retrieved graphic information to so-called affine transformation, projection conversion onto a screen coordinate, and light source processing for the apexes. The graphic information after the projection conversion (polygon data) is sent to a rendering unit 52.

The rendering unit 52 is responsible for calculation for displaying polygons on the screen, and converts polygon data sent from the geometry calculation unit 50 into pixels. The rendering unit 52 can roughly be divided into a polygon setup/rasterizing unit 61 (hereinafter, simply abbreviated as PSR unit 61), a pixel pipeline unit 63 and a frame buffer 64.

The rendering unit 52 is provided with a texture buffer 54 and a Z buffer 55. The texture buffer 54 stores texel colors of textures that are R, G, B values and α values (A) for defining pixel colors for polygons. The Z buffer 55 stores Z values which express the depth-wise distance of an image from a viewpoint. The texture and Z values herein are previously captured by being read out from various recording media such as a CD-ROM, DVD-ROM or semiconductor memory, or by being downloaded through communication or transmission media based on line or radio communication.

The PSR unit 61 is provided with a constitution for enabling linear interpolation which is known as so-called DDA (digital differential analysis). The PSR unit 61 is responsible for retrieving and buffering polygon data sent from the geometry calculation unit 50, pixel generation through rasterizing, and calculation of texel coordinate values. Pixel data and texel coordinate values are sent to the pixel pipeline unit 63. The PSR unit 61 is also provided with a pixel coverage parameter generation unit 62 (hereinafter, simply abbreviated as PCP unit 62) for finding the pixel coverage value Cov expressing the ratio of area occupied by a polygon within one pixel.

The pixel pipeline unit 63 determines the individual pixel colors based on the texel coordinate values received from the PSR unit 61 and reference to texel colors obtained from the texture buffer 54, and then executes texture mapping taking the Z values stored in the Z buffer 55 into consideration.

The pixel pipeline unit 63 is also provided with a multiplication unit 71 and an α-blending unit 72. The multiplication unit 71 multiplies the pixel coverage value Cov obtained from the PCP unit 62 by the α value α of each pixel obtained from the texture buffer 54. The α-blending unit 72 performs α-blending for every pixel.

In anti-aliasing of the semi-transparent polygon PGb explained above with reference to FIGS. 1 and 2, the pixel pipeline unit 63 performs the calculations expressed by formulae (5) and (6). In this case, the multiplication unit 71 is activated, and the α value αb of the semi-transparent polygon PGb is multiplied by the pixel coverage value Cov. The α-blending unit 72 then performs α-blending of each pixel using the obtained multiplied product as a new α value.

On the other hand, the multiplication unit 71 of the pixel pipeline unit 63 is inactivated for anti-aliasing of opaque polygons. More specifically, the multiplication unit 71 herein does not perform multiplication. Instead, the α-blending unit 72 sets α values corresponding to the pixel coverage values for such opaque polygons, and performs α-blending depending on the newly set α values.

It is to be noted that if aliasing should occur in polygons, such aliasing may not be noteworthy for the user if such polygons are those composing an image of a less important scene. It is therefore also allowable in the rendering processing device of the present embodiment to inactivate anti-aliasing for the polygons composing an image of a less important scene.

As for the polygons composing an image of an important scene, aliasing will not always be very distinctive, even when the polygons are not subjected to anti-aliasing, if such polygons have an extremely high transparency. It is therefore also allowable in the rendering processing device of the present embodiment to disable the multiplication step by inactivating the multiplication unit 71 of the pixel pipeline unit 63 for semi-transparent polygons which do not show distinct aliasing by virtue of their extremely high transparency, and thus have only a small necessity for anti-aliasing. The α-blending unit 72 in this case performs α-blending depending on the α values preset to the semi-transparent polygons.

The rendering processing device of the present embodiment can also regulate activation/inactivation of the multiplication step by the multiplication unit 71 depending on the details of the image to be rendered. More specifically, the rendering processing device will inactivate the multiplication step by the multiplication unit 71 when the aliasing occurs in an image of a less important scene and exerts only a limited degree of visual influence to such image if aliasing should occur to some degree. The α-blending unit 72 in this case performs α-blending depending on the α values preset to the polygons in the image of such less important scene.

Of course, the rendering processing device can activate the multiplication unit 71 when an opaque polygon is subjected to anti-aliasing, or even when a semi-transparent polygon less affected by aliasing or a polygon in a less important scene is to be handled. It is to be noted, however, that it is advantageous for the rendering processing device to inactivate the multiplication unit 71 for opaque polygons, semi-transparent polygons less affected by aliasing or polygons in a less important scene in terms of relieving the device from the calculation load.

As has been described above, the rendering processing device is designed to freely select activation or inactivation of anti-aliasing depending on the details of the image to be rendered, the transparency of the polygon and so forth, so that the device can execute a proper rendering process as required. Since various rendering processes depending on need are executable in the present embodiment, a larger degree of freedom will be ensured in developmental efforts for application software for image rendering, which allows the software supplier to freely produce his or her desired software.

Set values for setting activation or inactivation of the multiplication unit 71 are provided on a register 53. Which set values are to be output from the register 53 is controlled, for example, by the CPU 58 based on the control program. More specifically, when anti-aliasing is to be performed for a semi-transparent polygon, the CPU 58 controls the register 53 so as to output a set value to activate the multiplication unit 71. On the other hand, when anti-aliasing is to be performed for an opaque polygon, or when anti-aliasing is less necessary, the CPU 58 controls the register 53 so as to output a set value to render the multiplication unit 71 inactive. The CPU 58 can also determine whether a source a value of a polygon expresses a high transparency or low transparency, and switch the activation/inactivation of the multiplication unit 71 in a real-time manner based on such determination.

The individual pixel data output from the pixel pipeline unit 63 are sent to the frame buffer 64. The frame buffer 64 is provided with a memory space corresponding to the display (screen) 57, such as a television monitor, in which color values of the individual pixels will be written. Screen data by frames are thus formed in such memory space, and are read out upon request by a display control unit 56.

The display control unit 56 generates horizontal synchronizing signals and vertical synchronizing signals of the television monitor device, and also serially retrieves pixel data from the frame buffer 64 in a line-feed manner in synchronization with the display timing on the monitor. The serially-retrieved, line-fed color values compose a two-dimensional image which will be displayed on the display 57.

The rendering process of the present embodiment is not only achievable through such hardware constitution shown in FIG. 3, but can, of course, also be implemented on a software basis (application programs for a computer).

Figure 4:
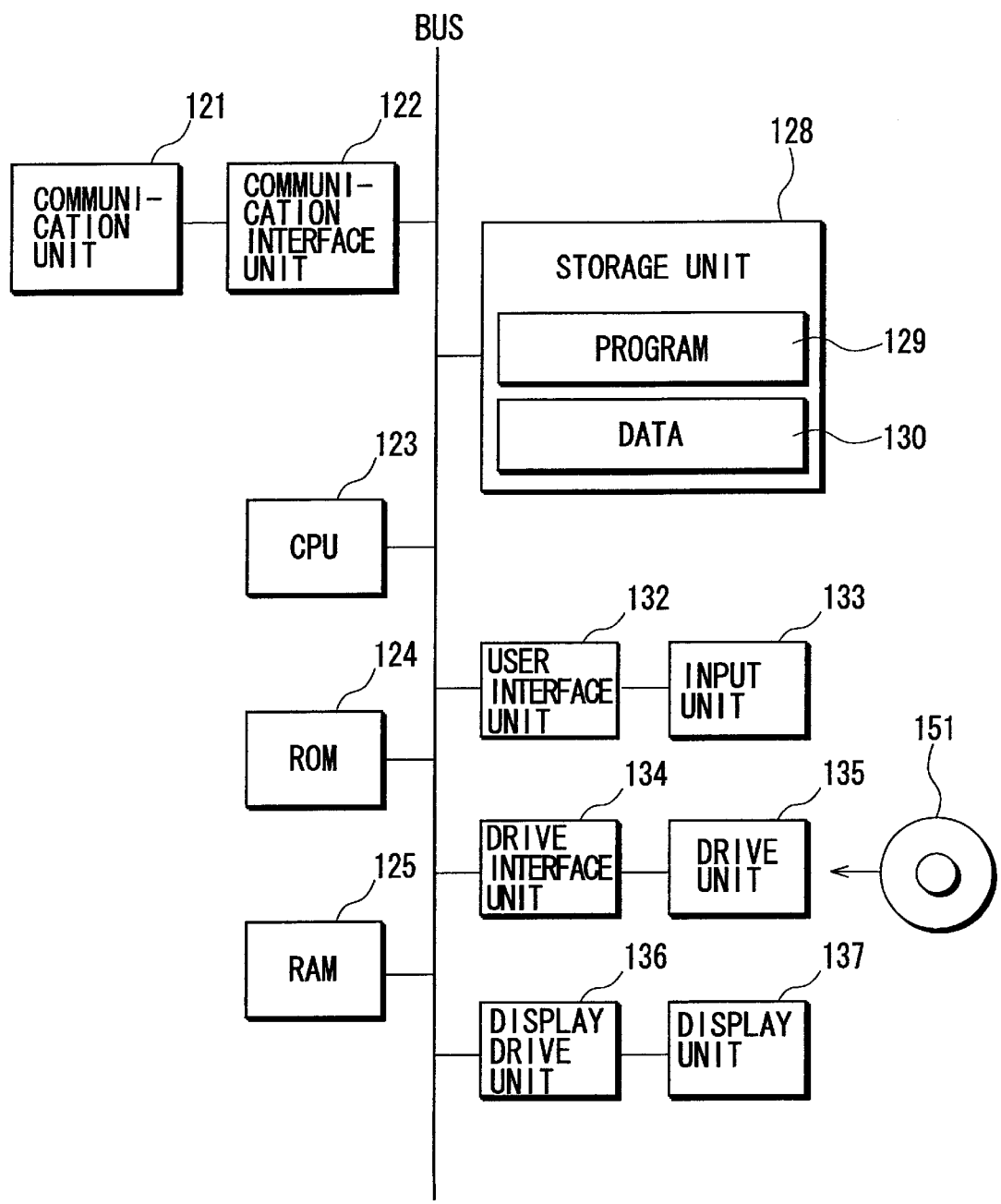
FIG. 4 is a block diagram showing the schematic constitution of a computer implementing the rendering process.
Figure 5:
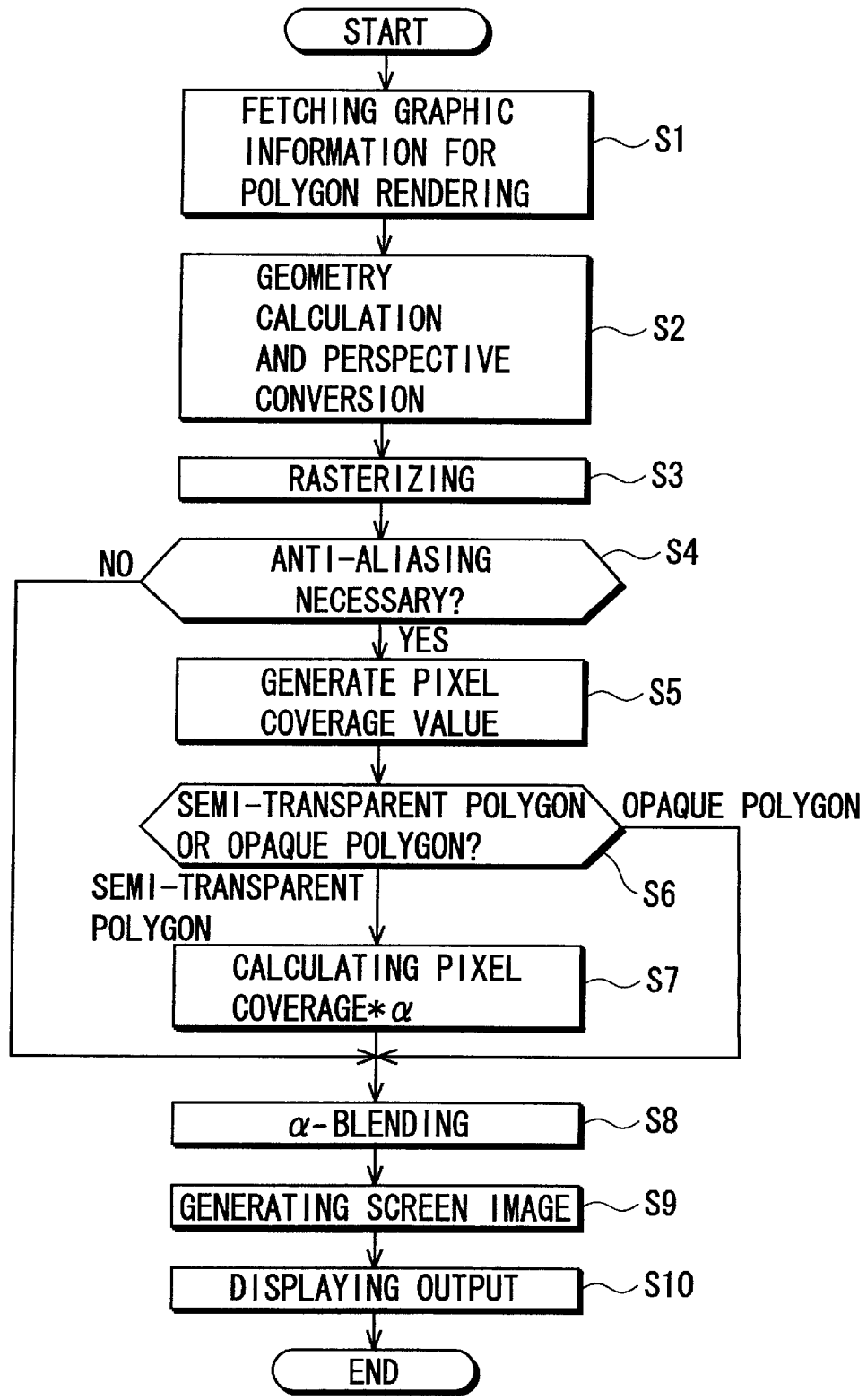
FIG. 5 is a flow chart of a rendering process executed by a computer.

FIGS. 4 and 5 show the constitution and operation of a computer on which the rendering process is implemented. FIG. 4 shows an exemplary constitution of the principal portion of the computer. FIG. 5 shows a process flow according to which a CPU 123 of the computer shown in FIG. 4 executes the rendering process program of the present invention.

In FIG. 4, a storage unit 128 typically comprises a hard disk and a drive therefor. Such storage unit 128 has stored therein an operating system program, a computer program 129 including the rendering process program of the present embodiment read out from various recoding media, such as a CD-ROM or DVD-ROM, or downloaded through a communication line, and a variety of data 130, such as graphic information for polygon rendering, and RGBA values and Z values for textures.

A communication unit 121 refers to a communication device responsible for data communication with external devices, which may be a modem for establishing connection to an analog public telephone line, a cable modem for establishing connection to a cable television network, a terminal adaptor for establishing connection to an ISDN (integrated services digital network), or a modem for establishing connection to an ADSL (asymmetric digital subscriber line). A communication interface (I/F) unit 122 refers to an interface device responsible for protocol transfer to enable send/receive of data between the communication unit 121 and an internal bus.

An input unit 133 refers to an input device, such as a keyboard, mouse or touch pad, and a user interface (I/F) unit 132 refers to an interface device for supplying signals from such input unit 133 to the internal components.

A drive unit 135 refers to a drive device capable of reading out various data or programs from a recording medium including a disk medium 151, such as a CD-ROM, DVD-ROM or floppy (trade mark) disk, or from a card-type or other type of semiconductor memory. A drive interface (I/F) unit 134 refers to an interface device for supplying signals from the drive unit 135 to the internal components.

A display unit 137 refers to a display device, such as a CRT (cathode ray tube) or liquid crystal display, and a display drive unit 136 is a device for driving such display unit 137.

The CPU 123 controls the entire operation of the personal computer based on the operating system program stored in the storage unit 128 or the computer program 129 of the present embodiment.

A ROM 124 typically comprises a rewritable non-volatile memory, such as a flash memory, and stores a BIOS (basic input/output system) and various default values of the personal computer. A RAM 125 will have loaded therein application programs and various data read out from a hard disk of the storage unit 128, and is used as a work RAM of the CPU 123.

In the constitution shown in FIG. 4, the CPU 123 can accomplish the image processing described in the above embodiment by executing the rendering process program of the embodiment, which is one of the application programs read out from the storage unit 128 and loaded into the RAM 125.

Next, the process flow which occurs when the CPU 123 of the computer shown in FIG. 4 operates based on the rendering process program of the present embodiment will be explained with reference to FIG. 5.

In step S1 shown in FIG. 5, the CPU 123 retrieves from the storage unit 128 graphic information for polygon rendering, and RGBA values and Z values for textures stored therein as data 130, and allows the RAM 125 to hold them.

The CPU 123 then, in step S2, retrieves the graphic information held by the RAM 125, and subjects the graphic information to geometry calculation and perspective conversion, such as affine conversion, projection conversion onto a screen coordinate, and light source processing for the apexes.

In step S3, the CPU 123 performs rasterizing using polygon data obtained by the geometric calculation, and then, in step S4, determines whether anti-aliasing is or is not necessary. If it is determined that anti-aliasing is necessary, the processing of the CPU 123 advances to step S5, and if not, to step S8.

In step S5, the CPU 123 generates a pixel coverage value. Next, in step S6, the CPU 123 determines whether the polygon is semi-transparent or opaque. If the polygon is found in step S6 to be semi-transparent, the pixel coverage value is multiplied by the α value in step S7. The CPU 123 then, in step S8, performs α-blending using such multiplication product as a new α value. This successfully finishes anti-aliasing for the semi-transparent polygon in which aliasing tends to be conspicuous.

On the other hand, if the polygon was found in step S6 to be opaque, the CPU 123 performs α-blending in step S8 using the pixel coverage value obtained in step S5 as an α value, to thereby subject such opaque polygon to anti-aliasing.

The semi-transparent polygon already determined in step S4 as not being in need of anti-aliasing, or a polygon in an less-important scene, is subjected to α-blending in step S8 using α values preset to such polygons.

The CPU 123 then, in step S9, generates a screen image from the pixel data, and sends information on such screen image to the display drive 136 in step S10. An image will thus appear on the display unit 137.

As has been described above, the rendering processing device of the present embodiment implements anti-aliasing for a semi-transparent polygon which is in need of such processing by multiplying a source α value of such semi-transparent polygon by a pixel coverage value, and by then performing α-blending using the multiplied product as a new α value.

On the other hand, the rendering processing device of the present embodiment performs α-blending also for an opaque polygon by using a general pixel coverage value as an α value. The rendering processing device can also control processing so as to perform only general α-blending without effecting anti-aliasing for semi-transparent polygons in which aliasing is inconspicuous, which successfully relieves the device from processing loads.

The rendering process in the present embodiment can select activation/inactivation of anti-aliasing depending on the details of an image to be rendered or the transparency of the polygon, so that the device can execute the proper rendering process as required. Another advantage of the rendering process of the present embodiment is that a larger degree of freedom will be ensured in developmental efforts for application software.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

For example, the rendering process of the present embodiment is applicable not only to a specialized video game machine or personal computer, but also to various information processing devices including portable phone terminals. While color images were exemplified by the present embodiment, the present invention is also applicable to monochrome images.

What is claimed is:

1. A process for rendering a specified pixel located at least partly in a first polygon composed of a plurality of pixels, the first polygon being semi-transparent and being a part of an image including pixels located in a second polygon, the rendering process comprising:

determining a fraction of the area of the specified pixel located in the first polygon;

retrieving a preset value for expressing a degree of transparency of the specified pixel;

multiplying the fraction of the area by the preset value to obtain a multiplied product; and mixing a preset color for the specified pixel with a color of another pixel based on the multiplied product, the another pixel being located in the second polygon underlying the specified pixel.

2. The rendering process according to claim 1, wherein the multiplied product represents a corrected degree of transparency for the specified pixel.

3. A device for rendering a specified pixel located at least partly in a first polygon composed of a plurality of pixels, the first polygon being semi-transparent and being a part of an image including pixels located in a second polygon, the rendering device comprising:

a calculation unit operable to determine a fraction of the area of the specified pixel located in the first polygon;

a retrieving unit operable to retrieve a preset value for expressing a degree of transparency of the specified pixel;

a multiplication unit operable to multiply the fraction of the area by the preset value to obtain a multiplied product; and a mixing unit operable to mix a preset color for the specified pixel with a color of another pixel based on the multiplied product, the another pixel being located in the second polygon underlying the first polygon.

4. The rendering device according to claim 3, wherein the multiplied product represents a corrected degree of transparency for the specified pixel.

5. A computer-readable recording medium having recorded thereon a program for rendering a specified pixel located at least partly in a first polygon composed of a plurality of pixels, the first polygon being semi-transparent and being a part of an image including pixels located in a second polygon, the rendering program comprising:

determining a fraction of the area of the specified pixel located in the first polygon;

retrieving a preset value for expressing a degree of transparency of the specified pixel;

multiplying the fraction of the area by the preset value to obtain a multiplied product; and mixing a preset color for the specified pixel with a color of another pixel based on the multiplied product, the another pixel being located in the second polygon underlying the first polygon.

6. The computer-readable recording medium according to claim 5, wherein the multiplied product represents a corrected degree of transparency for the specified pixel.

7. A system for rendering a specified pixel located at least partly in a first polygon composed of a plurality of pixels, the first polygon being semi-transparent and being part of an image including pixels located in a second polygon, the rendering system comprising:

a processor operable to execute instructions; and instructions for performing a method, the method including:

determining a fraction of the area of the specified pixel located in the first polygon;

retrieving a preset value for expressing a degree of transparency of the specified pixel;

multiplying the fraction of the area by the preset value to obtain a multiplied product; and mixing a preset color for the specified pixel with a color of another pixel based on the multiplied product, the another pixel being located in the second polygon underlying the first polygon.

* * * * *

UNITED STATES PATENT AND TRADEMARK OFFICE
CERTIFICATE OF CORRECTION

PATENT NO.   : 6,847,375 B2
DATED        : January 25, 2005
INVENTOR(S)  : Shinya Wada It is certified that error appears in the above-identified patent and that said Letters Patent is hereby corrected as shown below:

Column 3,
Line 13, "source a" should read -- source $\alpha$ --.

Column 7,
Line 13, "a value" should read -- $\alpha$ value --.

Signed and Sealed this

Third Day of May, 2005

JON W. DUDAS
*Director of the United States Patent and Trademark Office*